United States Patent [19]

Hottori et al.

[11] Patent Number: 4,669,830
[45] Date of Patent: Jun. 2, 1987

[54] ELECTROCHROMIC MATERIAL AND LUBRICANT

[75] Inventors: Makoto Hottori; Shoji Yamanaka, both of Hiroshima, Japan

[73] Assignee: Daicel Chemical Industries, Ltd., Sakai, Japan

[21] Appl. No.: 782,247

[22] Filed: Sep. 30, 1985

Related U.S. Application Data

[62] Division of Ser. No. 597,986, Apr. 9, 1984, Pat. No. 4,562,056.

[30] Foreign Application Priority Data

Apr. 18, 1983 [JP] Japan .................................. 58-68130
Jul. 22, 1983 [JP] Japan .................................. 58-133779
Feb. 3, 1984 [JP] Japan .................................. 59-18876

[51] Int. Cl.$^4$ .............................................. G02F 1/36
[52] U.S. Cl. ........................................ 350/357; 252/25
[58] Field of Search ........................................... 350/357

[56] References Cited

U.S. PATENT DOCUMENTS

| 3,521,941 | 7/1970 | Deb et al. | 340/785 |
| 3,827,784 | 8/1974 | Giglia et al. | 350/357 |
| 4,068,928 | 1/1978 | Meyers et al. | 350/357 |
| 4,088,392 | 5/1978 | Meyers | 350/357 |
| 4,110,015 | 8/1978 | Reddy | 350/357 |
| 4,120,568 | 10/1978 | Deb et al. | 350/357 |
| 4,482,216 | 11/1984 | Hashimoto et al. | 350/357 |

FOREIGN PATENT DOCUMENTS 11325 1/1982 Japan .................................. 350/357

OTHER PUBLICATIONS

PCT WO82/03697.

Primary Examiner—John Doll
Assistant Examiner—Wayne A. Langel
Attorney, Agent, or Firm—Flynn, Thiel, Boutell & Tanis

[57] ABSTRACT

A layered compound of beta-ZrNX in which X is chlorine, bromine or a solid solution of chlorine and bromine is useful as a lubricant or an electrochromic display member.

3 Claims, 8 Drawing Figures

ELECTROCHROMIC MATERIAL AND LUBRICANT

This is a division of application Ser. No. 597,896, filed Apr. 9, 1984, now U.S. Pat. No. 4,562,056.

This invention relates to use of a layered compound of beta-ZrNX in which X is chlorine, bromine or a solid solution of chlorine and bromine as a lubricant or an electrochromic display member and to a process for preparing said layered compound. In the invention, the layered compound is used for lubricating a mechanism or an industrial material therewith. The invention provides a lubricating composition which comprises a lubricating base oil or grease and from 0.1 to 10 wt. %, preferably 0.5 to 1.0 wt. % based on the base oil or grease, of said layered compound and to a self-lubricating member combination which comprises a base material and as a lubricating agent from 2 to 50 wt. %, preferably 5 to 50 wt. %, more preferably 10 to 30 wt. %, based on the material, of said layered compound. Moreover the invention relates to an electrochromic display member which comprises a transparent, electroconductive electrode, a thin layer of said layered compound, an electrolyte containing lithium ion therein and a counter electrode. The invention concerns a process for producing said layered compound which comprises the step of reacting zirconium hydride and/or metallic zirconium with ammonium chloride and/or ammonium bromide.

BRIEF DESCRIPTION OF DRAWINGS ATTACHED HERETO

Figure 4:
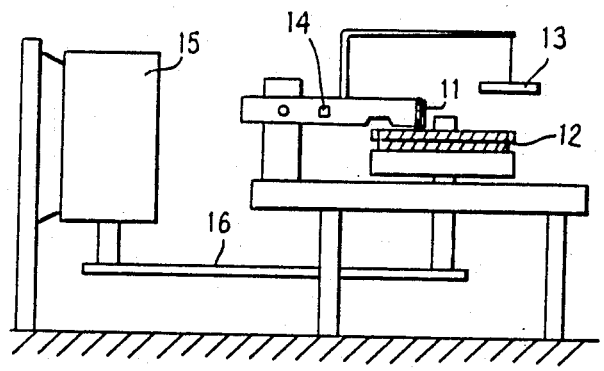

FIG. 4 indicates a friction test machine to be used in examples of the invention.

Figure 5:
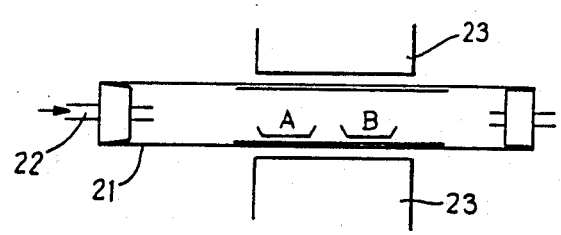
Figure 6:
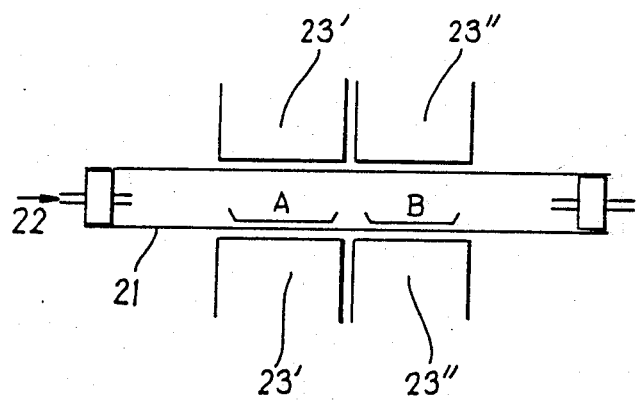

FIGS. 5 and 6 indicate each a reactor unit to be used in the process of preparing beta-ZrNX of the invention.

Figure 7:
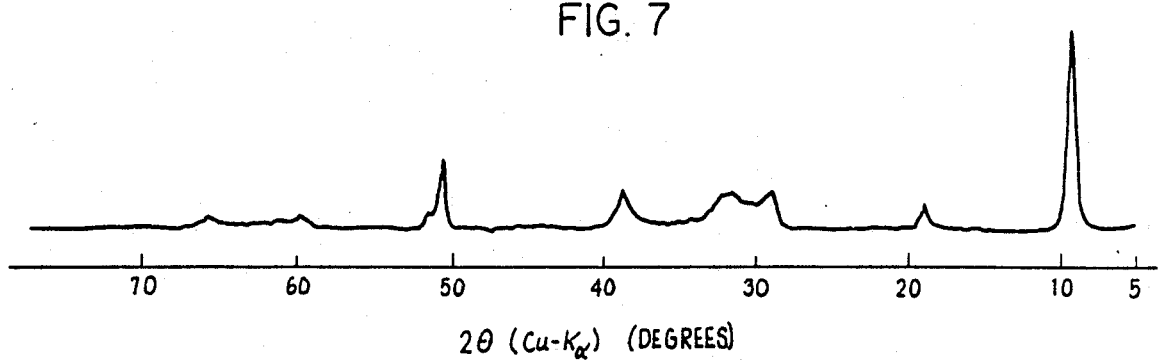
Figure 8:
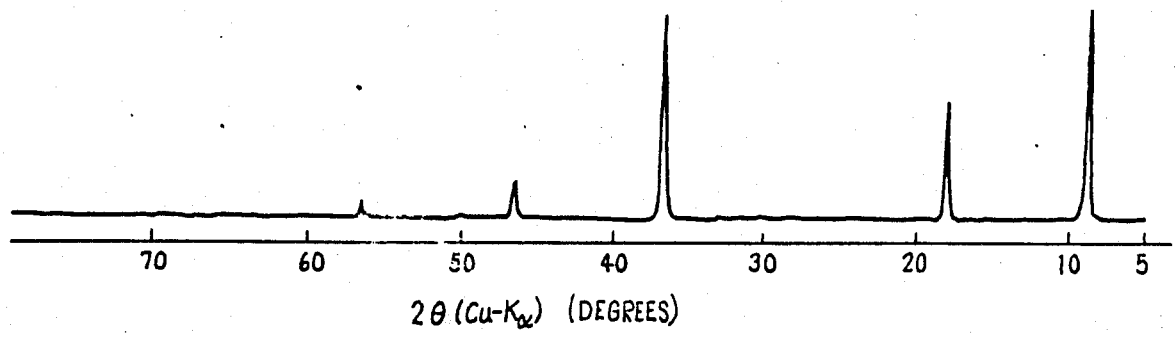

FIGS. 7 and 8 show X-ray diffraction patterns of the compounds obtained in Examples 1 and 3, respectively.

The invention will be illustrated below the order of the process of preparation, use of the electrochromic display and then use of the lubricant, together with description of the prior art.

PROCESS FOR PREPARATION

The following three methods for preparing the layered crystal have been hitherto known.

(1) A method utilizing a gas/gas reaction in which $ZrCl_4$ vapor and ammonia gas are reacted at elevated temperatures (Yogyo Kyokaishi, 85, 173 (1977) and Bull. Chem. Soc. Japan, 56, 2638 (1953)).

(2) A method utilizing a solid/gas reaction in which solid phase $ZrCl_4$ or $ZrBr_4$ was reacted with ammonia gas at 300° to 350° C. to obtain α-ZrNCl or α-ZrNBr, which is then reacted in an ammonia stream at 650° C. to convert into β-ZrNCl or β-ZrNBr (Z. Anorg. Allg. Chem., 332, 159 (1964)).

(3) A method in which metallic zirconium and zirconium nitride were reacted with ammonium chloride at elevated temperature (1000° to 1500° C.) under elevated pressure (30 to 40 kbar) (Khim., 16 (2), 246–8 (1975)).

However, $ZrCl_4$ and $ZrBr_4$ used in methods (1) and (2) as a starting material are highly hygroscopic and liable to be hydrolyzed, thereby making these two methods troublesome and furthermore making it very difficult to avoid contamination of the product with a hydrolyzate, i.e. $ZrO_2$. In addition, in method (1), $ZrCl_4.2NH_3$ and α-ZrNCl may be formed as byproducts at low temperatures while $Zr_3N_4$ and ZrN may be formed as byproducts at high temperatures, so that it is impossible to obtain β-ZrNCl in a pure state.

Although there has been no report describing synthesis of β-ZrNCl by method (1), it may be also difficult to obtain β-ZrNBr in a high purity by analogy with the difficulty in the synthesis of β-ZrNCl with this method.

According to method (2), it is possible to obtain β-ZrNCl or β-ZrNBr in a fairly high purity by a careful operation, although some contamination with $ZrO_2$ is observed. However $ZrCl.2NH_3$ may also be formed by the reaction of $ZrCl_4$ with $NH_3$ and removed by sublimation, resulting in a lower yield, i.e. 30 to 40% (Yogyo Kiso Toron, 1984).

Method (3) is advantageous because of the absence of the hygroscopic $ZrCl_4$. However the elevated temperature and pressure require a large-scale apparatus so that this method can not be used generally.

Under these circumstances, we have found a process for preparing industrially useful β-ZrNX in a high purity and high yield, as a result of our investigations, to thereby achieve the present invention.

Accordingly, this invention relates to a process for preparing a layered compound of β-ZrNX, wherein X represents Cl, Br or a solid solution of Cl and Br, characterized by reacting zirconium hydride ($ZrH_x$; wherein $0 < x \leq 2$) and/or metallic zirconium with ammonium chloride and/or ammonium bromide.

Zirconium hydride ($ZrH_x$; wherein $0 < x \leq 2$) and metallic zirconium to be used in this invention may be in any preferable form such as powder, granules or plate. In the process of the invention, said zirconium hydride ($ZrH_x$; wherein $0 < x \leq 2$) or metallic zirconium is heated usually to 400° to 800° C. and then allowed to react with ammonium chloride or ammonium bromide. This reaction is carried out by supplying gaseous ammonium chloride, ammonium bromide or a mixture thereof to the heated zirconium hydride ($ZrH_x$; wherein $0 < x \leq 2$) or metallic zirconium by using ammonia gas or an inert gas as a carrier gas. In this reaction, β-ZrNCl can be quantitatively obtained by using ammonium chloride, while α-ZrNBr can be obtained by using ammonium bromide. The obtained α-ZrNBr may be converted into β-ZrNBr by sealing in vacuo and heating to 550° to 900° C. for 5 to 40 hours.

The obtained β-ZrNCl may be heated in a similar manner to obtain β-ZrNCl having a higher crystallinity. Addition of a small amount of $ZrCl_4$ or $ZrBr_4$ during the thermal treating period may enhance the effect. However it is not always necessary to add $ZrBr_4$.

Ammonia gas is most suitably used as a carrier gas in the aforementioned reaction. However any other gas such as He, Ar or $N_2$ may be used unless it would adversely affect the reaction. By the use of $NH_3$, the reaction would proceed in a remarkably short period to give β-ZrNCl or α-ZrNBr quantitatively. Gaseous ammonium chloride or ammonium bromide being used in the reaction may be obtained by subliming solid ammonium chloride or ammonium bromide. Alternatively, it is possible to prepare these gaseous compounds by blowing ammonia gas and hydrogen chloride or hydrogen bromide gas simultaneously into a reaction zone and mixing. It is preferable to use excess ammonia gas.

ELECTROCHROMIC DISPLAY

In an electrochromic display (hereinafter abbreviated as ECD), an oxidation or reduction reaction on a transparent display electrode caused by impressing a DC voltage would result in coloration of said electrode, thereby forming a colored pattern. Impression of a reverse voltage would result in a reverse reaction to decolorize the colored pattern. An ECD having the aforementioned coloring-decoloring mechanism has attracted wide attention because of the following advantages as compared with conventional liquid crystals which have been used as a light-receiving display device capable of affording a clear display in the light: it requires only a similar electrical power to liquid crystals; it exhibits no dependence on a visual angle; it affords a clear color display; it has a memory function; it works in a wide temperature range; it is capable of affording a wide display; and so on.

Representative examples of electrochromic materials which have been proposed are organic compounds such as viologen derivatives (4,4'-bipyridine derivatives) and inorganic compounds such as tungsten oxide ($WO_3$), molybdenum oxide ($MoO_3$) or iridium oxide ($Ir(OH)_n$).

An ECD in which viologen derivatives are used has some advantages such as a high response speed and capability of polychromic display by altering the substituents. However the redox reaction is accompanied with a side reaction resulting in an irreversible state to thereby leave a contaminant on the electrode to lower the display quality. Therefore this type of ECD has not reached a practical level as yet.

Electrochromic materials based on inorganic compounds, particularly $WO_3$, have been used in practice today. An ECD in which $WO_3$ is used as a display electrode takes advantage of the change of $WO_3$ from colorless into blue by a reducing reaction. However the contrast of the blue color in a colored state is unsatisfactory.

As described above, it has been demanded to obtain an electrochromic material capable of affording a clear contrast and displaying various colors. As a result of our investigations, we have found a novel and excellent electrochromic material which changes from colorless or yellow to black by impressing a voltage on an electrode in a reduced state and reverts to colorless or yellow by impressing a voltage in a reverse direction, to thereby achieve the present invention.

Accordingly, this invention relates to an electrochromic material comprising a layered compound of the formula $\beta$-ZrNX, wherein X represents Br or Cl, obtained by utilizing intercalation by an electrochemical redox reaction in between the layers of the $\beta$-ZrNX and an electrochromic display device using said material.

When a voltage is impressed on $\beta$-ZrNX to induce a reducing reaction, lithium atoms are intercalated in between the layers of the $\beta$-ZrNX to form black $Li_xZrNX$, as shown in formula (1).

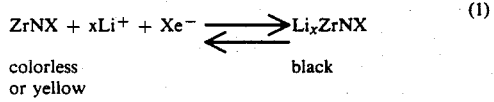

$$ZrNX + xLi^+ + Xe^- \rightleftarrows Li_xZrNX \quad (1)$$

colorless or yellow      black

Then, by impressing a voltage in a reverse direction to induce an oxidizing reaction, the lithium atoms present between the layers of the $\beta$-ZrNX are liberated to revert to the original colorless or yellow state. This reaction would proceed reversibly by altering the electrical potential to give oxidized and reduced states alternately. This reversible reaction would result in a reversible color change of the electrode.

This invention provides an ECD device with a remarkably clear contrast by the use of the $\beta$-ZrNX showing the above reversibility as a display electrode material of the ECD.

The $\beta$-ZrNX used in the present invention may be prepared by reacting zirconium tetrachloride or tetrabromide in an ammonia stream at 300° to 400° C. to obtain $\alpha$-ZrNX and converting the obtained $\alpha$-ZrNX to a $\beta$-form by heating to 500° to 650° C. The obtained $\beta$-ZrNX is formed into film and provided on a transparent conductive electrode to thereby form an electrochromic electrode of ECD.

Examples of the transparent conductive electrode to be used to form the electrochromic display device of the present invention are glass or plastic films coated with $SnO_2$, $In_2O_3$, Au etc. A $\beta$-ZrNCl film may be formed on said transparent conductive electrode by applying $\beta$-ZrNCl powder with a binder such as polyvinyl alcohol, vacuum metallizing or ion sputtering.

Figure 1:
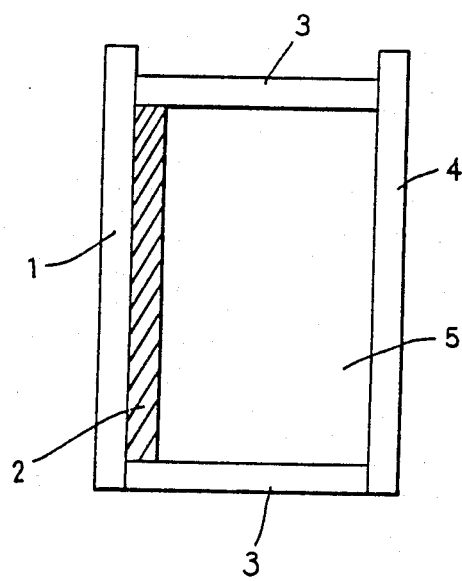
FIG. 1 shows an embodiment of the invention in respect to the electrochromic use and illustrates a schematic sectional view of an ECD cell of a display device.

The electrochromic display device thus obtained may be encapsulated in an ECD cell as shown in FIG. 1, wherein reference numeral 1 represents a transparent conductive electrode, 2 represents a $\beta$-ZrNCl film provided on the electrode 1, 3 represents a spacer, 4 represents a counter-electrode and 5 represents an electrolyte.

Any material may be used as the counter-electrode so long as it may undergo an electrode reaction with the display electrode of the present invention. Examples of said material are platinum, gold, carbon, indium oxide, tungsten oxide, tin oxide, silver and lithium.

Examples of the electrolyte are an aqueous solution of LiCl, $LiClO_4$ or the like, an organic electrolyte prepared by dissolving $LiClO_4$ in an organic solvent such as propylene carbonate or acetonitrile, and a solid electrolyte.

Impression of a DC voltage on an ECD device composed as shown in FIG. 1 to realize a negative display electrode causes a rapid color change from colorless or yellow to black. Then the impression of a voltage in a reverse direction converts the black display device to colorless or yellow immediately. The ECD device of the present invention has a long repeating life and a stable memory function.

In addition, the electrochromic material of the present invention may be used in a shutter of a camera or an optical printer by taking advantage of the electrochemical redox reaction which causes the color to change from colorless to black.

LUBRICANT

Layered compounds such as molybdenum disulfide, tungsten disulfide, graphite, graphite fluoride or the like have been widely used as a solid lubricant. Among them, graphite has been known to exhibit a significant decrease in the lubricating properties in vacuo or in a dry atmosphere. Therefore it has been presumed that the lubricating mechanism thereof might relate to a layer of absorbed water on the surface of graphite particles. On the other hand, molybdenum disulfide retains excellent lubricating properties in vacuo. It is considered that the layered structure of molybdenum disulfide would result in such excellent lubricating properties. That is to say, the binding force stacking crystal layers is significantly weak in van der Waals' gaps between the layers of a layered crystal. Therefore such a crystal may be liable to slide parallel to the layers, resulting in a decrease in friction. As compared with the weak binding force between the layers, atoms in a crystal layer are strongly bonded to each other predominantly with an ionic or covalent bond. Accordingly a solid lubricant taking advantage of layered crystals has an excellent load bearing capacity and can be used as an extreme-pressure additive.

As described above, a layered solid lubricant exhibits excellent properties which are not observed in usual lubricating oils containing mineral oil as a main component. However conventional layered solid lubricants have some disadvantages. Namely, they are liable to decompose to generate a corrosive gas or form an oxide under an oxidative atmosphere at high temperatures, thereby bringing about wear. Therefore molybdenum disulfide and tungsten disulfide should not be used as lubricating solids in an oxidative atmosphere at temperatures above 300° C. However recent developments of new materials have made it possible to use highly heat-resistant metallic and ceramic materials in practice. Therefore the need for a solid lubricant suitable in an oxidative and corrosive atmosphere at high temperatures will be increased in the future. Under these circumstances, we have found a novel solid lubricant which exhibits excellent properties, in particular high heat- and chemical-resistance, and suitable in an oxidative atmosphere at high temperatures as a result of our investigations to thereby achieve the present invention.

Accordingly, this invention relates to a solid lubricant comprising a layered compound of the general formula $\beta$-ZrNX, wherein X represents Cl, Br or a solid solution of Cl and Br.

The zirconium of the above formula can form a solid solution with hafnium or titanium. Now the process for the preparation, the structure of the compound and physical properties of a solid lubricant comprising a layered compound of the general formula $\beta$-ZrNCl, which is a typical compound exhibiting the most suitable lubricating properties among those having the aforementioned general formula, will be described.

In preparing the layered compound, zirconium tetrachloride is heated to 300° to 350° C. in an ammonia stream to obtain $\alpha$-ZrNCl. The obtained $\alpha$-ZrNCl is heated to 500° to 650° C. in an ammonia stream to obtain a yellowish green product, $\beta$-ZrNCl, readily. Alternately, gaseous zirconium tetrachloride prepared by preheating may be reacted with ammonia gas at 500° to 750° C. to obtain $\beta$-ZrNCl of the layered structure in the form of fine particles. Furthermore $\beta$-ZrNCl may be sealed in a tube together with a small amount of $ZrCl_4$ and heated to 500° to 1000° C. for 5 to 20 hours to obtain $\beta$-ZrNCl having an excellent layered structure, i.e. having excellent lubricating properties.

Figure 2:
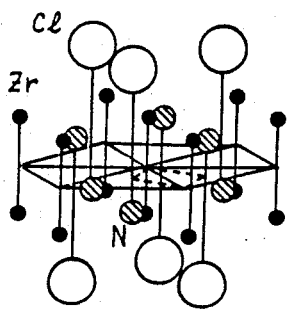
FIG. 2 is an illustration of the layered structure to be used in the invention.

The $\beta$-ZrNCl of the invention has an atomic arrangement similar to that of $CdBr_2$ as shown in FIG. 2. The chlorine atoms are placed above and below the (Zr-N) layer to form a hexagonal, layered lattice. The disordered stacking of layers makes it possible to orient the layers in any pattern, which means that the long-range force of $\beta$-ZrNCl holding stacked layers is weaker than that of $MoS_2$ or graphite having a regular stacking so that $\beta$-ZrNCl has inter-layer spaces capable of freely sliding to thereby afford an ideal property as a solid lubricant. The arrangement of $\beta$-ZrNCl in a crystal layer is defined primarily by a chemical bond between Zr and N atoms. As shown by the fact that a transition metal nitride generally has a high melting point and a high hardness, Zr and N atoms form a firm bond. Therefore $\beta$-ZrNCl may be expected to exhibit a high load bearing capacity when used as a solid lubricant similar to molybdenum disulfide.

Advantages of the solid lubricant according to this invention are as follows.

(1) It retains excellent lubricating properties at high temperatures.

(2) It is more stable in an oxidative atmosphere than $MoS_2$ or graphite.

FIG. 2 is a chart obtained by thermogravimetric analysis of molybdenum disulfide and $\beta$-ZrNCl in an air atmosphere.

Figure 3:
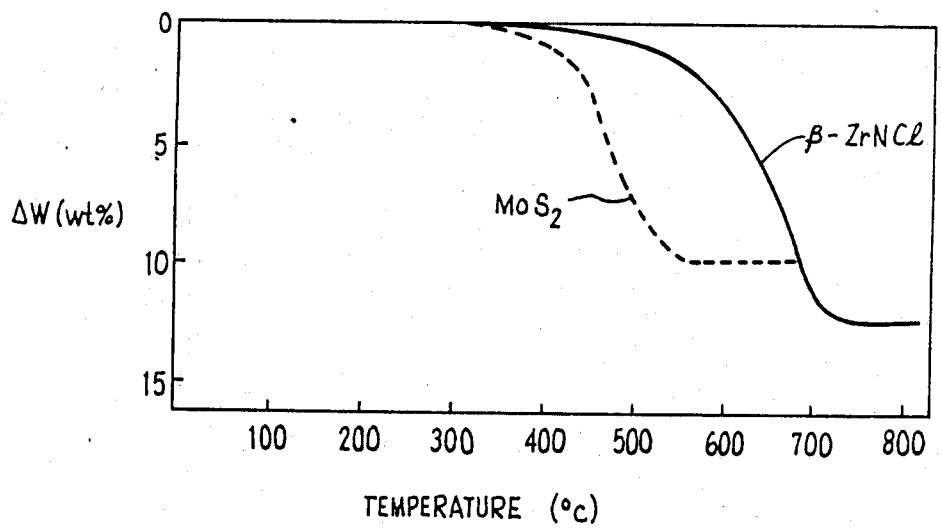
FIG. 3 is a thermogravimetric chart of beta-ZrNX according to the invention and $MoS_2$ in comparison.

As shown in FIG. 3, the weight of $MoS_2$ begins to decrease gradually in the vicinity of 320° C. and $MoO_3$ is formed at high temperatures in an oxidative atmosphere. On the other hand, the weight of $\beta$-ZrNCl would not significantly decrease until the vicinity of 550° C. and $ZrO_2$ is formed by oxidation at temperatures above 700° C. These facts indicate that $\beta$-ZrNCl is more stable than $MoS_2$ at high temperatures in an oxidative atmosphere.

(3) It exhibits an excellent chemical-resistance.

Generally speaking, chloride crystals have high solubilities in water. However, the compound ($\beta$-ZrNCl; zirconium chloride nitride) according to this invention is insoluble in water and exhibits an excellent water-proofness. In addition, it is also stable in a solution of sodium hydroxide or hydrochloric acid.

(4) Low reactivity thereof with a base material such as a metal enables the lubricating properties to be maintained for a long time. On the contrary, sulfidic lubricants such as molybdenum disulfide would form a sulfide with a metallic base material such as copper to thereby not only lower the lubricating properties but corrode the base material. The solid lubricant of this invention is less reactive and available for a metallic base material such as copper.

(5) The lubricating properties thereof would not be lowered in vacuo.

The lubricating properties of some lubricants such as graphite would significantly decrease under high vacuum. On the contrary, the solid lubricant of this invention would be still excellent under high vacuum.

The solid lubricant of this invention may be used for all purposes where lubricating properties are required in various forms. Some of representative uses are as follows.

(1) It may be used for conventional spindle oil, refrigerator oil, compressor oil, dynamo oil, turbine oil, machine oil, engine oil, cylinder oil, gear oil, aircraft lubricating oil, hydraulic oil, cup grease, fiber grease, graphite grease, automotive wheel bearing grease, automotive chassis grease or the like by incorporating into lubricating oil or grease. Examples of said lubricating oil are mineral oils such as naphthenic hydrocarbons or aromatic hydrocarbons, synthetic oils such as olefin polymer oils, diester oils, polyalkylene glycol oils, halogenated hydrocarbon oils, silicone oils, phosphate oils or fatty oils. Examples of said grease are those prepared by adding metallic soaps, bentonite, silica gel, copper phthalocyanine, allylurea, fluoroplastics or the like to a base oil such as mineral oils or synthetic oils as described above.

(2) It may be added to a material such as synthetic resins, synthetic rubbers, carbon, ceramics, metals or a composite thereof with glass fiber, carbon fiber or the like to obtain a molded material which is available as a self-lubricating bearing material, packing material, sealing material and the like. Examples of said synthetic resins are phenolic resins, urea resins, epoxy resins, fluoroplastics, acetal resins, polycarbonate, polyamide, polyimide, polyester, polyphenylene sulfide, and silicone resins. Examples of said synthetic rubbers include styrene/butadiene rubber, chloroprene rubber, neoprene rubber and nitrile rubber.

(3) It is available as a mold release agent for use in molding plastics, rubbers, diecast metals, glass, sintered alloys or the like.

(4) It is available as a lubricant, press oil or drawing oil in processing metals e.g. cutting, perforating or abrading.

(5) It may be used in a lubricating coating composition. That is, the solid lubricant of this invention may be added to an organic or inorganic film-forming material and applied on a sliding surface to form a drying lubricating film to thereby improve the lubricating properties and initial fit of the sliding surface.

The invention will be illustrated more in detail below in reference to examples.

PREPARATION EXAMPLE 1

A manufacturing device unit as shown in FIG. 5 was used. A and B each indicate a heating zone. Ammonia gas was passed through the unit as a carrier gas at a rate of 50 ml/min. 1.227 g of $NH_4Cl$ and 0.2989 g of a metallic zirconium plate were placed in zones A and B, respectively, and allowed to react for two hours at 650° C. to afford 0.2959 g of a pale yellowish green powdery product in zone B. This product was identified as beta-ZrNCl by X-ray diffractometry. FIG. 7 is an X-ray diffraction pattern of the product. Yield: 64.2%.

PREPARATION EXAMPLE 2

$NH_3$ gas was passed through a unit containing 0.3106 g of $ZrH_2$ in the heating zone and similar to that used in Preparation Example 1 at a rate of 200 ml/min. for an hour to replace the atmosphere with ammonia. Subsequently $NH_3$ gas was passed at a rate of 50 ml/min while raising the temperature to 400° C. Then HCl gas was passed at a rate of 25 ml/min while the temperature was still continuously raised. When the temperature reached to 650° C., these materials were allowed to react for 30 min to give 0.4024 g of a pale yellowish green powdery product. An X-ray diffraction pattern of the product was similar to that of Preparation Example 1, indicating that it was $\beta$-ZrNCl. Yield: 85.9%.

PREPARATION EXAMPLE 3

A gaseous mixture of $N_2$ and $NH_3$ was passed through a unit containing 7.551 g of $NH_4Br$ in zone A and 1.027 g of $ZrH_2$ in Zone B and similar to that used in Preparation Example 1 at 650° C. to obtain yellow powder in zone B. An X-ray diffraction pattern of the powder showed that it was $\alpha$-ZrNBr. The obtained $\alpha$-ZrNBr was sealed in a quartz tube in vacuo and heated to 850° C. in an electric furnace for 24 hours to obtain 1.544 g of a pale yellowish green crystalline product. The product was identified as $\beta$-ZrNBr by X-ray diffractometry. Yield: 75.7%. FIG. 8 is an X-ray diffraction pattern of the product.

PREPARATION EXAMPLE 4

Ammonia gas was passed through a unit as shown in FIG. 6 as a carrier gas at a rate of 50 ml/min. 1.251 g of $NH_4Cl$ was placed in zone A while 0.3115 g of $ZrH_2$ was placed in zone B. Then zones A and B were heated to 400° C. and to 650° C., respectively for the reaction to obtain 0.3526 g of a powdery pale yellowish green product in zone B. An X-ray diffraction pattern of the product was similar to that of Preparation Example 1, showing that it was beta-ZrNcl. Yield : 76.5%.

PREPARATION EXAMPLE 5

$N_2$ gas was passed through a unit similar to that used in Preparation Example 4 as a carrier gas. 1.216 g of $NH_4Cl$ was placed in zone A while 0.3028 g of $ZrH_2$ was placed in zone B. Then zones A and B were heated to 400° C. and to 650° C., respectively, for the reaction to obtain 0.3122 g of a pale yellowish green powdery product in zone B. The obtained product was identified as $\beta$-ZrNCl by X-ray diffractometry similar to Preparation Example 1. Yield: 68.3%.

USE EXAMPLE 1

$ZrCl_4$ was allowed to react in an $NH_3$ stream at 350° in an electric furnace to give $\alpha$-ZrNCl. The obtained $\alpha$-ZrNCl was converted into $\beta$-ZrNCl by heating to 600° C. The obtained $\beta$-ZrNCl was admixed with a 1% aqueous solution of polyvinyl alcohol, applied on a transparent electrode ($SnO_2$) and dried at 120° C. for 12 hours to form a display electrode. An ECD cell as shown in FIG. 1 was constructed by using a platinum counter-electrode and a 1 mol/l solution of $LiClO_4$ in tetrahydrofuran as an electrolyte. A DC pulse voltage altering from +3.0 V to −3.9 V at a pulse period of 10 sec was impressed on the both ends of the cell. The color of the display electrode changed to black at −3.9 V and it reverted to yellow at +3.0 V. The coloring-decoloring process thereof was very definite, thereby affording a clear contrast. The coloring-decoloring cycle could be repeated $10^2$ times with no trouble.

USE EXAMPLE 2

The variations of the coefficients of friction were measured by using dried powder of $\beta$-ZrNCl as a solid lubricant by a pin-on-disc method. Three pins (4 mm$\phi$) made of (1) aluminum reinforced with alumina fibers, (2) carbon steel SS41 for general machine structural use and (3) carbon steel S35C for general machine structural use, respectively, were used. The carbon steel S45C which had been hardened and tempered and had a hardness $H_{RC}$ of 49 to 50 was abraded for use as a material for the disc.

The $\beta$-ZrNCl used in the present Example was prepared in the following manner.

Zirconium tetrachloride was allowed to react in an electric furnace in an ammonia stream at 600° C. to obtain $\beta$-ZrNCl in the form of fine powder. The obtained $\beta$-ZrNCl was sealed in a tube together with a small amount of zirconium tetrachloride and heated to 800° C. for additional 15 hours.

FIG. 4 is a schematic illustration of a test machine, wherein reference numeral 11 is a pin, 12 is a disc, 13 is a load, 14 is a strain gauge, 15 is a motor and 16 is a V-belt.

The disc was allowed to rotate at a sliding rate of 2 m/sec with a load of 500 g under atmospheric pressure. A rapid increase in the coefficient of friction was observed after the initiation of the rotation and it went up to a constant state within several min.

Application of β-ZrNCl to the surface of the disc with a paint brush at this point altered the coefficient of friction as shown in Table 1. Table 1 indicates that the solid lubricant of this invention would effectively lower the coefficient of friction.

TABLE 1

| Material of pin | (i) aluminum reinforced with alumina fibers | (ii) SS41 | (iii) S35C |
|---|---|---|---|
| Without the solid lubricant of the invention | 0.60 | 0.66 | 0.65 |
| With the solid lubricant of the invention | 0.19 | 0.17 | 0.18 |

The embodiments of the invention in which an exclusive property or privilege is claimed are defined as follows:

1. An electrochromic display member comprising: a transparent, electroconductive electrode having a surface; a thin electrochromic layer on said electrode surface, said electrochromic layer consisting essentially of a layered compound of beta-ZrNX, wherein X is chlorine, bromine or a solid solution of chlorine and bromine; a layer of liquid electrolyte contacting the surface of said electrochromic layer remote from said electrode surface, said liquid electrolyte containing lithium ions therein, and an electroconductive counterelectrode contacting said electrolyte layer and spaced from said electrochromic layer.

2. An electrochromic display member as claimed in claim 1 in which said transparent, electroconductive electrode is made of a glass or plastic substrate coated with $SnO_2$, $In_2O_3$ or Au, and said thin electrochromic layer is coated on said transparent, electroconductive electrode, said counter electrode being made of a material selected from the group consisting of platinum, gold, carbon, indium oxide, tungsten oxide, tin oxide, silver and lithium, and said electrolyte is an aqueous or organic solvent solution of LiCl or $LiClO_4$.

3. An electrochromic display member which comprises a transparent electroconductive electrode comprising a substrate of plastic or glass coated with a conductive layer of $SnO_2$, $InO_2$ and Au,
 a thin electrochromic layer of a colorless or yellow layered compound of beta-ZrNX coated on said electrode, wherein X is chlorine, bromne or a solid solution of chlorine and bromine,
 a counterelectrode spaced apart a predetermined distance from said thin electrochromic layer, said counterelectrode being made of a material selected from the group consisting of platinum, gold, carbon, indium oxide, tungsten oxide, tin oxide, silver and lithium,
 and a liquid electrolyte disposed between and contacting said thin electrochromic layer and said counterelectrode, said electrolyte comprising an aqueous or organic solvent solution of LiCl or $LiClO_4$,
 said lithium ions being capable of being intercalated between the layers of said beta-ZrNX to convert same to a black color when a voltage is impressed on said electrochromic display member to induce a reducing reaction.

* * * * *

UNITED STATES PATENT AND TRADEMARK OFFICE
CERTIFICATE OF CORRECTION

PATENT NO. : 4 669 830
DATED : June 2, 1987
INVENTOR(S) : Makoto Hattori et al

It is certified that error appears in the above-identified patent and that said Letters Patent is hereby corrected as shown below:

On the title page, at item [75] change the name of the first inventor listed therein to ---Makoto Hattori---.

Column 10, line 19; change "bromne" to ---bromine---.

Signed and Sealed this

Fifth Day of April, 1988

Attest:

DONALD J. QUIGG

*Attesting Officer*  *Commissioner of Patents and Trademarks*